Aug. 5, 1924.
1,5-3,756
J. HASSELBERGER
AIR AND DUST GUARD FOR LEVER OPENINGS
Filed Jan. 24, 1924
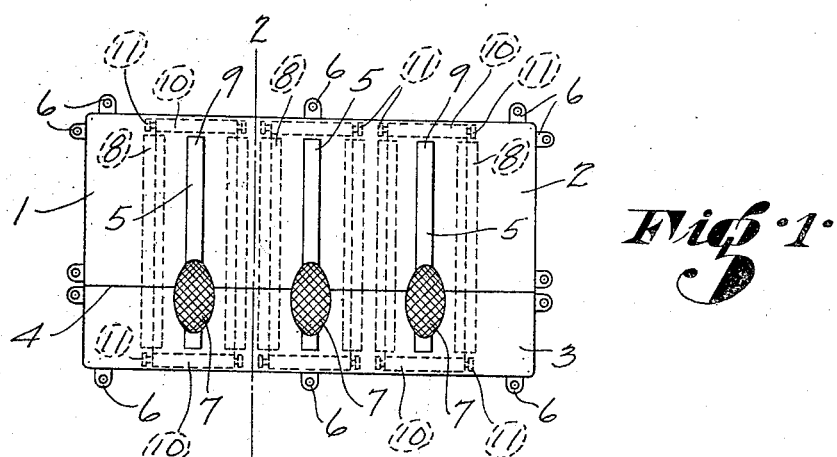
Fig. 1.
Fig. 2.
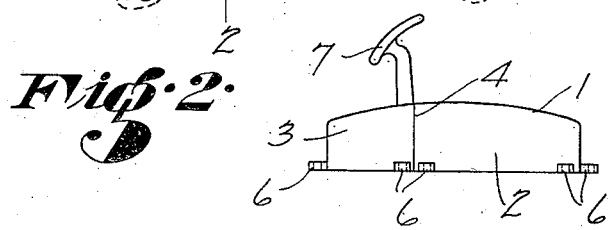
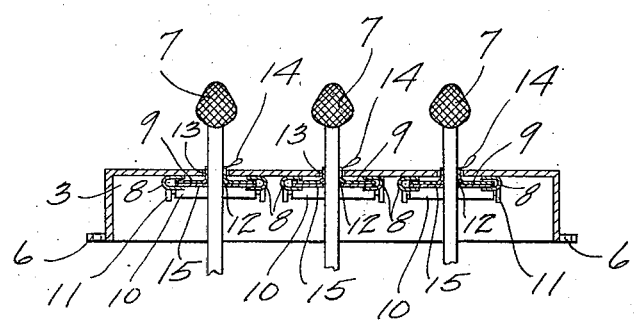
Fig. 3.
Fig. 4.
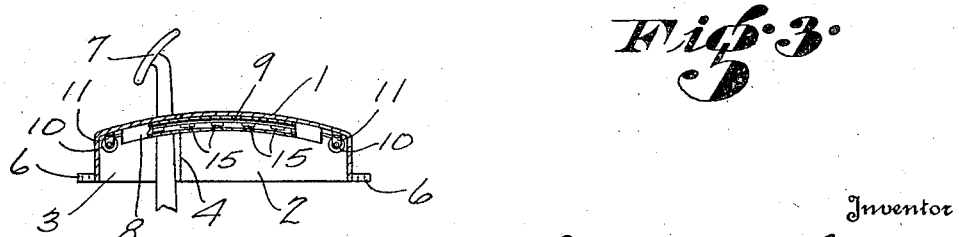
Inventor
John Hasselberger
By Adam E. Fisher
J.G. Attorney Patented Aug. 5, 1924.

1,503,756

UNITED STATES PATENT OFFICE.

JOHN HASSELBERGER, OF EAST HAMPTON, NEW YORK.

AIR AND DUST GUARD FOR LEVER OPENINGS.

Application filed January 24, 1924. Serial No. 688,169.

*To all whom it may concern:*

Be it known that I, JOHN HASSELBERGER, a citizen of the United States, residing at East Hampton, in the county of Suffolk and State of New York, have invented certain new and useful Improvements in Air and Dust Guards for Lever Openings, of which the following is a specification.

This invention pertains to closures for pedal and other lever openings through the floors of automobiles, and is especially intended for those automobiles having comparatively extended floor slots for the accommodation of pedal levers and the like.

The object of the invention is to provide a practical self-adjusting closure for the openings described, and which will act to effectually exclude air and dust from entering the automobile through such openings.

In the drawing—

Figure 1 is a plan view of the device as mounted in a car;

Figure 2 is an end view;

Figure 3 is a longitudinal vertical section.

Figure 4 is a transverse section on line 2—2 in Figure 1.

The invention includes a two-piece sheet metal shell or casing 1, made in two parts 2 and 3, and adapted to fit together along a parting line 4 so as to form a complete whole as shown. Pedal slots 5 are formed in this casing to correspond with the floor slots (not shown) of the machine. This casing is left open on its under side and is provided with screw lugs 6 for securing the same in place upon the floor of the car and over the operating levers 7 thereof. The division of the case into two parts on the line 4 facilitates its mounting over the levers. The metal along the edges of the slots 5 are provided with flanged guideways 8 adapted to engage the edges of sliding curtains 9 which are wound upon and held by spring set rollers 10 mounted in bearings 11, one at each end of each of the said slots 5 after the manner of the ordinary window shade on a spring roller. No patentable feature is claimed for the spring roller and shade per se, but only as drawn into combination as a closure for the lever slots referred to, and hence the details of the construction and mounting of such rollers and shades are not entered into here. The curtains for each lever slot are cut out at each end as shown at 12, so as to embrace their respective levers, and they may be strengthened at these points by collars 13, which collars are in turn secured to the lever bars in any suitable manner, as by cords 14. The curtains 9 along the portions adjacent to the levers, may be supported by metal strips 15 which are secured to the curtains and have bearings at each end within the guide ways 8. When the levers are moved back and forth along the slots 5, in the operation of the car, the curtains 9 follow, winding or unwinding upon or from the rollers 10, and thus always keeping the slots 5 closed against air currents.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In combination with the levers and lever slots of an automobile, a device of the kind described, comprising a two-piece casing adapted for mounting over the said floor slots and having lever slots to accommodate said levers, the metal along the edges of the said casing slots having guideways formed therein; curtains mounted on spring set rollers at each end of the slots and slidingly passed along the guideways of the casing slots; means for securing the ends of the curtains to the lever bars; and means for supporting the curtains in place.

In testimony whereof I affix my signature.

JOHN HASSELBERGER.

Witnesses:
  MIRIAM F. SHAW,
  JOSEPH S. OSBORNE.